United States Patent
Mathew et al.

(10) Patent No.: US 9,129,648 B2
(45) Date of Patent: Sep. 8, 2015

(54) MULTIPLE TRACK DETECTION

(71) Applicant: LSI Corporation, San Jose, CA (US)

(72) Inventors: George Mathew, San Jose, CA (US); Bruce A. Wilson, San Jose, CA (US); Jongseung Park, Allentown, PA (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 14/158,739

(22) Filed: Jan. 17, 2014

(65) Prior Publication Data

US 2015/0199991 A1 Jul. 16, 2015

Related U.S. Application Data

(60) Provisional application No. 61/928,394, filed on Jan. 16, 2014.

(51) Int. Cl.
G11B 20/10 (2006.01)
G11B 5/09 (2006.01)

(52) U.S. Cl.
CPC .... *G11B 20/10046* (2013.01); *G11B 20/10055* (2013.01); *G11B 20/10222* (2013.01); *G11B 20/10268* (2013.01); *G11B 5/09* (2013.01)

(58) Field of Classification Search
CPC .. G11B 20/10222; G11B 27/32; G11B 20/14; G11B 20/10046; G11B 20/10268; G11B 20/10018; G11B 5/09; G11B 20/10009; G11B 5/035
USPC .......................................... 360/31, 32, 30, 65
See application file for complete search history.

(56) References Cited

U.S. PATENT DOCUMENTS

| 8,300,685 B2* | 10/2012 | Chen et al. ..................... 375/233 |
| 8,693,126 B2* | 4/2014 | Buckholdt et al. ............... 360/55 |
| 8,711,517 B2* | 4/2014 | Erden et al. ..................... 360/121 |
| 8,929,011 B1* | 1/2015 | Song et al. ....................... 360/39 |
| 2013/0286502 A1 | 10/2013 | Erden et al. |
| 2014/0154991 A1* | 6/2014 | Brown et al. .................... 455/42 |
| 2015/0029608 A1* | 1/2015 | Mathew et al. ................. 360/30 |
| 2015/0062730 A1* | 3/2015 | Mathew et al. ................. 360/29 |
| 2015/0070796 A1* | 3/2015 | Mathew et al. ................. 360/32 |

OTHER PUBLICATIONS

U.S. Appl. No. 14/055,886, Unpublished filed Oct. 17, 2013 (Xiufeng Song).
U.S. Appl. No. 14/048,897, Unpublished filed Oct. 8, 2013 (George Mathew).
U.S. Appl. No. 14/031,990, Unpublished filed Sep. 19, 2013 (George Mathew).
U.S. Appl. No. 14/021,811, Unpublished filed Sep. 9, 2013 (George Mathew).

\* cited by examiner

*Primary Examiner* — Ali Neyzari
(74) *Attorney, Agent, or Firm* — Hamilton DeSanctis & Cha

(57) ABSTRACT

An apparatus for reading data includes an array of analog inputs operable to receive analog signals retrieved from a magnetic storage medium, wherein the analog inputs correspond to multiple data tracks on the magnetic storage medium, and wherein the number of analog inputs in the array of analog inputs is greater than the number of data tracks being read, at least one joint equalizer operable to filter the analog inputs to yield an equalized output for each of the data tracks being read, and at least one data detector operable to apply a detection algorithm to the equalized output from the joint equalizer to yield detected values for each of the data tracks being read.

19 Claims, 5 Drawing Sheets

MULTIPLE TRACK DETECTION

CROSS REFERENCE TO RELATED APPLICATIONS

The present application claims priority to (is a non-provisional of) U.S. Pat. App. No. 61/928,394, entitled "Multiple Track Detection", and filed Jan. 16, 2014 by Mathew et al, the entirety of which is incorporated herein by reference for all purposes.

FIELD OF THE INVENTION

Various embodiments of the present invention provide systems and methods for detecting values from multiple data tracks using an array-reader in a magnetic recording system.

BACKGROUND

In a typical magnetic storage system, digital data is stored in a series of concentric circular tracks along a storage medium. Data is written to the medium by positioning a read/write head assembly over the medium at a selected location as the storage medium is rotated, and subsequently passing a modulated electric current through the head assembly such that a corresponding magnetic flux pattern is induced in the storage medium. To retrieve the stored data, the head assembly is positioned anew over the track as the storage medium is rotated. In this position, the previously stored magnetic flux pattern induces a current in the head assembly that can be converted to the previously recorded digital data.

BRIEF SUMMARY

Some embodiments of the present invention provide an apparatus for reading data including an array of analog inputs operable to receive analog signals retrieved from a magnetic storage medium, wherein the analog inputs correspond to multiple data tracks on the magnetic storage medium, and wherein the number of analog inputs in the array of analog inputs is greater than the number of data tracks being read, at least one joint equalizer operable to filter the analog inputs to yield an equalized output for each of the data tracks being read, and at least one data detector operable to apply a detection algorithm to the equalized output from the joint equalizer to yield detected values for each of the data tracks being read.

This summary provides only a general outline of some embodiments according to the present invention. Many other embodiments of the present invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

Embodiments of the present invention are related to systems and methods for detecting values from multiple data tracks using an array-reader in a magnetic recording system. In an array-reader, an array of read heads is provided, yielding multiple data streams. The array of read heads is wide enough to span multiple data tracks simultaneously, so that multiple data tracks are read in a single pass over the storage medium. In some embodiments, the number of read heads or readers in the array-reader is greater than the number of tracks to be detected. This can be used in some embodiments to improve noise compensation, for example reducing inter-track interference from one or more neighboring tracks adjacent to each of the target tracks being read.

The data from each of the read heads is processed first by a preamplifier in a read/write head, then by a read channel including circuits such as, but not limited to, an analog front end, analog to digital converter, equalizer, and data detector circuits. Because the array-reader is moved over a storage medium in the magnetic recording system on a moving or rotating arm, connected to the read channel by a flexible cable or flex cable, the array of read heads is angled differently in some embodiments as it is moved between the inner diameter and outer diameter of a magnetic storage disk. This changes the effective spacing between read heads in the array-reader, referred to herein as head skew. For example, in a system with an array-reader having three read heads spanning two data tracks, head skew can cause the three read heads to span only two data tracks near the inner diameter of the disk or four data tracks near the outer diameter of the disk. The multiple track detection system disclosed herein can be reconfigured in some embodiments at different array-reader positions to compensate for head skew.

Figure 1:
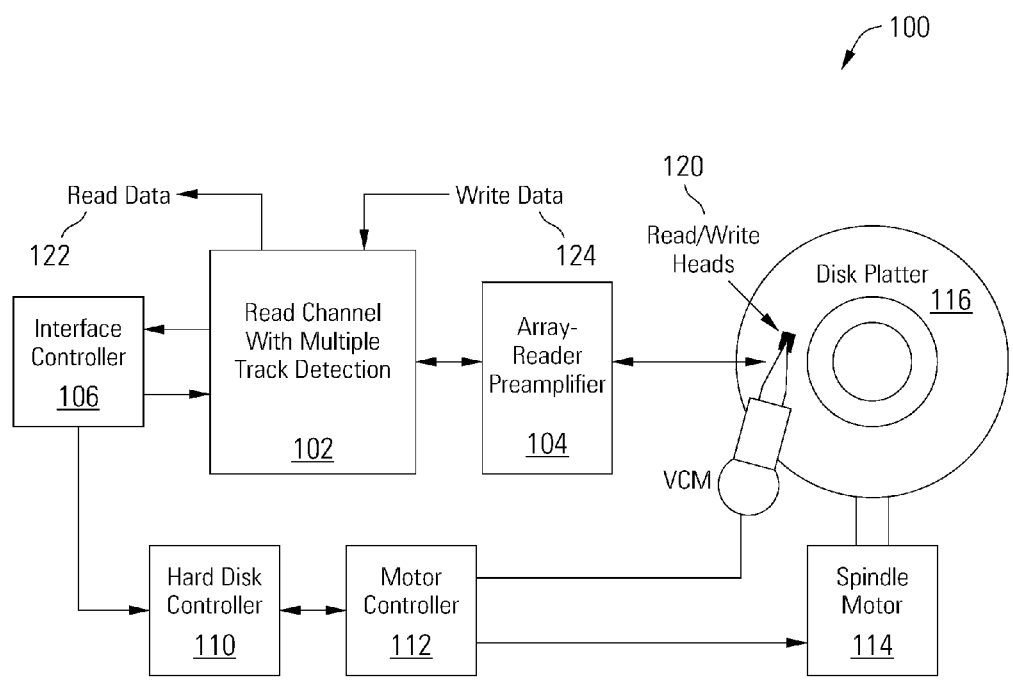
FIG. 1 depicts a magnetic storage system including an array-reader and multiple track detection in accordance with some embodiments of the present invention.

Turning to FIG. 1, an array-reader based magnetic storage system 100 with multiple track detection is depicted in accordance with some embodiments of the present invention. The storage system 100 includes a read channel circuit 102 with multiple track detection. Storage system 100 may be, for example, a hard disk drive. Storage system 100 also includes an array-reader preamplifier 104, an interface controller 106, a hard disk controller 110, a motor controller 112, a spindle motor 114, a disk platter 116, and a read/write head assembly 120. Interface controller 106 controls addressing and timing of data to/from disk platter 116. The data on disk platter 116 consists of groups of magnetic signals that may be detected by an array-reader in read/write head assembly 120 when the assembly is properly positioned over disk platter 116. In one embodiment, disk platter 116 includes magnetic signals recorded in accordance with either a longitudinal or a perpendicular recording scheme.

In a typical read operation, read/write head assembly 120 is accurately positioned by motor controller 112 over a number of desired data tracks on disk platter 116. Motor controller 112 both positions read/write head assembly 120 in relation to disk platter 116 and drives spindle motor 114 by moving read/write head assembly 120 to the proper data tracks on disk platter 116 under the direction of hard disk controller 110. Spindle motor 114 spins disk platter 116 at a determined spin rate (RPMs). Once read/write head assembly 120 is positioned adjacent the proper data tracks, magnetic signals representing data on disk platter 116 are sensed by an array-reader in read/write head assembly 120 as disk platter 116 is rotated by spindle motor 114. The sensed magnetic signals are provided as continuous, minute analog signals representative of the magnetic data on disk platter 116. These minute analog signals are processed by preamplifiers 104 and transferred to read channel circuit 102 via one or more pairs of flex cables. In turn, read channel circuit 102 digitizes and performs multiple track detection on the received analog signals to recreate the information originally written to disk platter 116. This data is provided as read data 122 to a receiving circuit. The multiple track detection can be implemented consistent with the disclosure below in relation to FIGS. 2-8. In some embodiments, the multiple track detection is performed consistent with the flow diagram disclosed below in relation to FIG. 9. A write operation is substantially the opposite of the preceding read operation with write data 124 being provided to read channel circuit 102. This data is then encoded and written to disk platter 116.

It should be noted that in some embodiments storage system 100 is integrated into a larger storage system such as, for example, a RAID (redundant array of inexpensive disks or redundant array of independent disks) based storage system. Such a RAID storage system increases stability and reliability through redundancy, combining multiple disks as a logical unit. Data can be spread across a number of disks included in the RAID storage system according to a variety of algorithms and accessed by an operating system as if it were a single disk. For example, data can be mirrored to multiple disks in the RAID storage system, or can be sliced and distributed across multiple disks in a number of techniques. If a small number of disks in the RAID storage system fail or become unavailable, error correction techniques can be used to recreate the missing data based on the remaining portions of the data from the other disks in the RAID storage system. The disks in the RAID storage system can be, but are not limited to, individual storage systems such storage system 100, and can be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

In addition, it should be noted that in some embodiments storage system 100 is modified to include solid state memory that is used to store data in addition to the storage offered by disk platter 116. This solid state memory may be used in parallel to disk platter 116 to provide additional storage. In such a case, the solid state memory receives and provides information directly to read channel circuit 102. Alternatively, the solid state memory may be used as a cache where it offers faster access time than that offered by disk platter 116. In such a case, the solid state memory may be disposed between interface controller 106 and read channel circuit 102 where it operates as a pass through to disk platter 116 when requested data is not available in the solid state memory or when the solid state memory does not have sufficient storage to hold a newly written data set. Based upon the disclosure provided herein, one of ordinary skill in the art will recognize a variety of storage systems including both disk platter 116 and a solid state memory.

Figure 2:
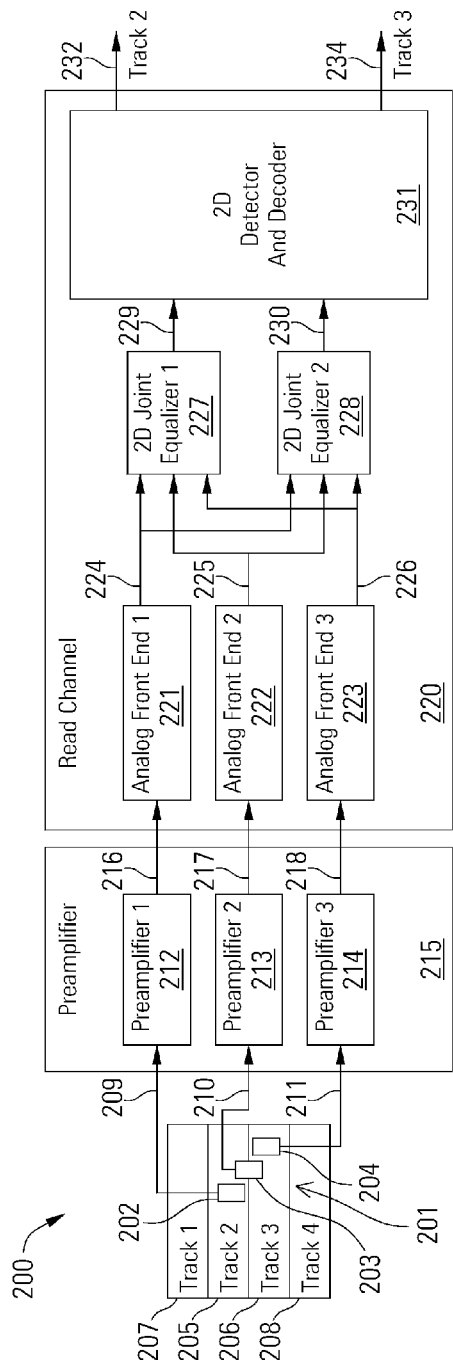
FIG. 2 depicts an array-reader magnetic recording system with multiple track detection including two-dimensional joint equalizers and a two-dimensional detector in accordance with some embodiments of the present invention.

Turning to FIG. 2, an array-reader magnetic recording system 200 with multiple track detection including two-dimensional joint equalizers 227, 228 and a two-dimensional detector 231 is depicted in accordance with some embodiments of the present invention. The array-reader magnetic recording system 200 reads multiple data tracks 205, 206 simultaneously with a greater number of read heads 202, 203, 204 than the number of target data tracks 205, 206 being read. In the embodiment of FIG. 2, the array-reader 201 includes three read heads 202, 203, 204 with a width and spacing adapted to read two data tracks 205, 206 simultaneously. Although some interference might be received from adjacent tracks 207, 208, the read heads 202, 203, 204 are arranged to generate output signals primarily from target data tracks 205, 206.

The multiple track detection performed by array-reader magnetic recording system 200 using a greater number of read heads 202, 203, 204 than target data tracks 205, 206 enhances detection signal-to-noise ratio (SNR) as well as throughput, improves handling of head skew, inter-track interference (ITI) and track-edge noise. Although the array-reader 202 of FIG. 2 includes three read heads 202, 203, 204 with a width and spacing adapted to read two data tracks 205, 206 simultaneously, the array-reader magnetic recording system 200 can include an array-reader that reads any number of target data tracks greater than one, using any number of read heads that is greater than the number of target data tracks being read.

The analog signals 209, 210, 211 from the array-reader 201 are provided to preamplifiers 212, 213, 214 in an array-reader preamplifier 215, yielding amplified analog signals 216, 217, 218. The preamplifiers 212, 213, 214 can be any circuits known in the art that are capable of amplifying analog signals. Based upon the disclosure provided herein, one of ordinary skill in the art will recognize a variety of amplifier circuits that may be used in relation to different embodiments of the present invention.

The amplified analog signals 216, 217, 218 from the array-reader preamplifier 215 are provided to a read channel 220 which is operable to digitize, to perform data detection to detect correct values of digital data and in some embodiments to perform data decoding to detect and correct errors in a codeword, yielding data outputs 232, 234 representing the data originally stored on the storage medium. The amplified analog signals 216, 217, 218 from the array-reader preamplifier 215 are provided to the read channel 220 via flex-cable in some cases.

The read channel 220 includes analog front end circuits 221, 222, 223 to process the amplified analog signals 216, 217, 218 corresponding to each of the read heads 202, 203, 204. The analog front end circuits 221, 222, 223 perform functions such as, but not limited to, amplification, biasing, and filtering of the amplified analog signals 216, 217, 218, yielding processed analog signals 224, 225, 226. The analog front end circuits 221, 222, 223 can be any circuits known in the art for processing analog signals prior to sampling and further processing such as equalization and value detection. Based upon the disclosure provided herein, one of ordinary skill in the art will recognize a variety of analog front end circuits that can be used in relation to different embodiments of the present invention.

The read channel 220 includes analog to digital converters (not shown) that sample the signals at any desired point in the data stream. For example, digitization can be performed on the processed analog signals 224, 225, 226 either before or after filtering or equalization in equalizers 227, 228. Analog to digital converters used in read channel 220 can be any circuit known in the art that is capable of producing digital samples corresponding to an analog input signal. Based upon the disclosure provided herein, one of ordinary skill in the art will recognize a variety of analog to digital converter circuits that can be used in relation to different embodiments of the present invention, and a variety of points in the data stream that are suitable for transition from the analog domain to the digital domain.

The processed analog signals 224, 225, 226 (or digitized versions thereof) are provided to two-dimensional joint equalizers 227, 228. In this embodiment, each of the two-dimensional joint equalizers 227, 228 receive input signals derived from all of the read heads 202, 203, 204. Each of the two-dimensional joint equalizers 227, 228 includes two banks of three filters, each bank equalizing its output to a two-dimensional partial response target. The two-dimensional joint equalizers 227, 228 each operate on an expanded trellis describing the joint properties of signal and noise on target data tracks 205, 206. In other words, the signal portion of the input to each two-dimensional joint equalizer 227, 228 is derived from multiple target data tracks 205, 206, and the decision trellis applied in each two-dimensional joint equalizer 227, 228 contains all possible options for the bits in the multiple target data tracks 205, 206. The two-dimensional joint equalizers 227, 228 equalize or filter the data for each of the target data tracks 205, 206, yielding equalized outputs 229, 230 for each of the target data tracks 205, 206. In some embodiments, the two-dimensional joint equalizers 227, 228 are digital finite impulse response filters that increase the signal-to-noise ratio in the equalized outputs 229, 230 for their corresponding target data tracks 205, 206. Based upon the disclosure provided herein, one of ordinary skill in the art will recognize a variety of equalizer circuits that can be used in relation to different embodiments of the present invention. Notably, the two-dimensional joint equalizers 227, 228 can be grouped into a single joint equalization circuit that operate as disclosed above.

The equalized outputs 229, 230 are provided to two-dimensional detector and decoder 231 which applies a data detection algorithm to the equalized outputs 229, 230 to yield outputs 232, 234 each corresponding to one of the target data tracks 205, 206. The two-dimensional detector and decoder 231 applies a two-dimensional detection algorithm to the equalized outputs 229, 230 detect the values of each data track 205, 206 using an expanded decision trellis describing the joint properties of the signal and noise of both data tracks 205, 206.

In some embodiments of the present invention, the two-dimensional detector and decoder 231 applies a Viterbi detection algorithm as is known in the art. In other embodiments of the present invention, the two-dimensional detector and decoder 231 applies a maximum a posteriori detection algorithm as is known in the art. Of note, the general phrase "Viterbi data detection algorithm" is used in its broadest sense to mean any Viterbi detection algorithm or variations thereof including, but not limited to, a bi-direction Viterbi detection algorithm. Also, the general phrase "maximum a posteriori data detection algorithm" is used in its broadest sense to mean any maximum a posteriori detection algorithm or variations thereof including, but not limited to, a simplified maximum a posteriori data detection algorithm and a max-log maximum a posteriori data detection algorithm. In other embodiments, yet other detection algorithms are applied by the two-dimensional detector and decoder 231. Based upon the disclosure provided herein, one of ordinary skill in the art will recognize a variety of data detector circuits that may be used in relation to different embodiments of the present invention.

The two-dimensional detector and decoder 231 also applies a data decoding algorithm in some embodiments, decoding a codeword from the detector for each of the data tracks 205, 206 to yield hard decisions at outputs 232, 234. In some embodiments, the detection and decoding process is performed in an iterative manner. In some embodiments, the two-dimensional detector and decoder 231 applies a low density parity check (LDPC) decoding algorithm as is known in the art. Based upon the disclosure provided herein, one of ordinary skill in the art will recognize other decoding algorithms that can be applied in two-dimensional detector and decoder 231 in relation to different embodiments of the present invention.

In some embodiments, when the read/write head is positioned over the storage medium or disk platter in zones where the head skew reduces the footprint of the array-reader to essentially one track (e.g., 205), the two-dimensional joint equalizer (e.g., 228) for the other track (e.g., 206) is disabled or powered down and the remaining joint equalizer (e.g., 227) is configured with a one-dimensional partial response target for the available data track (e.g., 205). The two-dimensional detector and decoder 231 is also configured as a one-dimensional detector and decoder using a trellis corresponding only to the available data track (e.g., 205).

Figure 3:
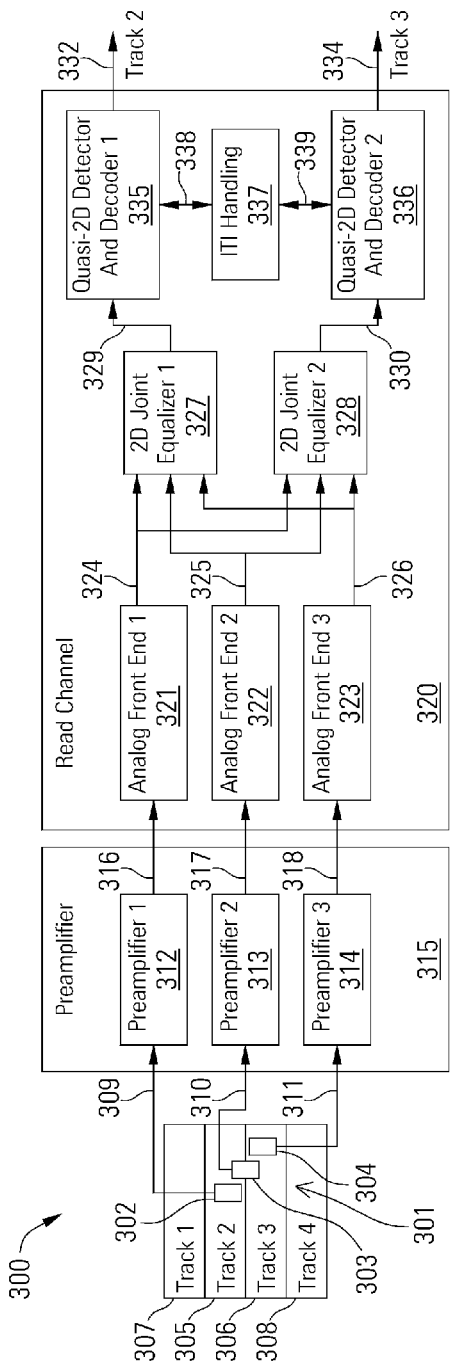
FIG. 3 depicts an array-reader magnetic recording system with multiple track detection including two-dimensional joint equalizers and quasi-two-dimensional detectors with inter-track interference handling between detectors in accordance with some embodiments of the present invention.

Turning to FIG. 3, an array-reader magnetic recording system 300 with multiple track detection including two-dimensional joint equalizers 327, 328 and quasi-two-dimensional detectors 335, 336 and an inter-track interference handler 337 is depicted in accordance with some embodiments of the present invention. In this embodiment, the quasi-two-dimensional detectors 335, 336 are configured to pass information such as, but not limited to, hard decisions or likelihood information between each other through inter-track interference handler 337 so that inter-track interference can be cancelled by quasi-two-dimensional detectors 335, 336. In this embodiment, the quasi-two-dimensional detectors 335, 336 can operate with only slightly more complexity than a one-dimensional detector. The array-reader magnetic recording system 300 reads multiple data tracks 305, 306 simultaneously with a greater number of read heads 302, 303, 304 than the number of target data tracks 305, 306 being read. In the embodiment of FIG. 3, the array-reader 301 includes three read heads 302, 303, 304 with a width and spacing adapted to read two data tracks 305, 306 simultaneously. Although the array-reader 302 of FIG. 3 includes three read heads 302, 303, 304 with a width and spacing adapted to read two data tracks 305, 306 simultaneously, the array-reader magnetic recording system 300 can include an array-reader that reads any number of target data tracks greater than one, using any number of read heads that is greater than the number of target data tracks being read. Although some interference might be received from adjacent tracks 307, 308, the read heads 302, 303, 304 are arranged to generate output signals primarily from target data tracks 305, 306.

The analog signals 309, 310, 311 from the array-reader 301 are provided to preamplifiers 312, 313, 314 in an array-reader preamplifier 315, yielding amplified analog signals 316, 317, 318. The preamplifiers 312, 313, 314 can be any circuits known in the art that are capable of amplifying analog signals. Based upon the disclosure provided herein, one of ordinary skill in the art will recognize a variety of amplifier circuits that may be used in relation to different embodiments of the present invention.

The amplified analog signals 316, 317, 318 from the array-reader preamplifier 315 are provided to a read channel 320 which is operable to digitize, to perform data detection to detect correct values of digital data and in some embodiments to perform data decoding to detect and correct errors in a codeword, yielding data outputs 332, 334 representing the data originally stored on the storage medium. The amplified analog signals 316, 317, 318 from the array-reader preamplifier 315 are provided to the read channel 320 via flex-cable in some cases.

The read channel 320 includes analog front end circuits 321, 322, 323 to process the amplified analog signals 316, 317, 318 corresponding to each of the read heads 302, 303, 304. The analog front end circuits 321, 322, 323 perform functions such as, but not limited to, amplification, biasing, and filtering of the amplified analog signals 316, 317, 318, yielding processed analog signals 324, 325, 326. The analog front end circuits 321, 322, 323 can be any circuits known in the art for processing analog signals prior to sampling and further processing such as equalization and value detection. Based upon the disclosure provided herein, one of ordinary skill in the art will recognize a variety of analog front end circuits that can be used in relation to different embodiments of the present invention. The read channel 320 includes analog to digital converters (not shown) that sample the signals at any desired point in the data stream, such as after the analog front end circuits 321, 322, 323.

The processed analog signals 324, 325, 326 (or digitized versions thereof) are provided to two-dimensional joint equalizers 327, 328. In this embodiment, each of the two-dimensional joint equalizers 327, 328 receive input signals derived from all of the read heads 302, 303, 304. Each of the two-dimensional joint equalizers 327, 328 includes two banks of three filters, each bank equalizing its output to a two dimensional partial response target. The two-dimensional joint equalizers 327, 328 each operate on an expanded trellis describing the joint properties of signal and noise on target data tracks 305, 306. In other words, the signal portion of the input to each two-dimensional joint equalizer 327, 328 is derived from multiple target data tracks 305, 306, and the decision trellis applied in each two-dimensional joint equalizer 327, 328 contains all possible options for the bits in the multiple target data tracks 305, 306. The two-dimensional joint equalizers 327, 328 equalize or filter the data for each of the target data tracks 305, 306, yielding equalized outputs 329, 330 for each of the target data tracks 305, 306. In some embodiments, the two-dimensional joint equalizers 327, 328 are digital finite impulse response filters that increase the signal-to-noise ratio in the equalized outputs 329, 330 for their corresponding target data tracks 305, 306. Based upon the disclosure provided herein, one of ordinary skill in the art will recognize a variety of equalizer circuits that can be used in relation to different embodiments of the present invention.

The equalized outputs 329, 330 are provided to quasi-two-dimensional detectors and decoders 335, 336 which each apply a data detection algorithm to their corresponding equalized output 329, 330 to yield outputs 332, 334 each corresponding to one of the target data tracks 305, 306. The equalized outputs 329, 330 are equalized to a two-dimensional partial response target. The quasi-two-dimensional detectors and decoders 335, 336 apply a quasi-two-dimensional detection algorithm to their corresponding equalized outputs 329, 330 to detect the values of each data track 305, 306 using a decision trellis describing the properties of the signal and noise of just their corresponding data tracks 305, 306. However, because the equalized outputs 329, 330 are equalized to a two-dimensional partial response target, the equalized outputs 329, 330 contain inter-track interference that is compensated for in quasi-two-dimensional detectors and decoders 335, 336 based on hard decisions or likehood passed through inter-track interference handler 337. The inter-track interference handler 337 is operable to pass iterative messages 338, 339 between quasi-two-dimensional detectors and decoders 335, 336 that is used by each of the quasi-two-dimensional detectors and decoders 335, 336 to estimate the inter-track interference from the other target data track. In some embodiments, the inter-track interference handler 337 includes buffer or memory circuits that enable the iterative messages 338, 339 to be available to the quasi-two-dimensional detectors and decoders 335, 336 when needed, synchronizing the iterative messages 338, 339 to data in the quasi-two-dimensional detectors and decoders 335, 336 during the detection process.

In some embodiments of the present invention, the quasi-two-dimensional detectors and decoders 335, 336 apply a Viterbi detection algorithm as is known in the art. In other embodiments of the present invention, the quasi-two-dimensional detectors and decoders 335, 336 apply a maximum a posteriori detection algorithm as is known in the art. In other embodiments, yet other detection algorithms are applied by the quasi-two-dimensional detectors and decoders 335, 336. Based upon the disclosure provided herein, one of ordinary skill in the art will recognize a variety of data detector circuits that may be used in relation to different embodiments of the present invention.

The quasi-two-dimensional detectors and decoders 335, 336 also apply a data decoding algorithm in some embodiments, decoding a codeword from the detector for each of the data tracks 305, 306 to yield hard decisions at outputs 332, 334. In some embodiments, the detection and decoding process is performed in an iterative manner. In some embodiments, the quasi-two-dimensional detectors and decoders 335, 336 apply a low density parity check (LDPC) decoding algorithm as is known in the art. Based upon the disclosure provided herein, one of ordinary skill in the art will recognize other decoding algorithms that can be applied in quasi-twodimensional detectors and decoders 335, 336 in relation to different embodiments of the present invention.

In some embodiments, when the read/write head is positioned over the storage medium or disk platter in zones where the head skew reduces the footprint of the array-reader to essentially one track (e.g., 305), the two-dimensional joint equalizer (e.g., 328) and quasi-two-dimensional detector and decoder (e.g., 336) and inter-track interference handler 337 for the other track (e.g., 306) is disabled or powered down and the remaining joint equalizer (e.g., 327) is configured with a one-dimensional partial response target for the available data track (e.g., 305).

Figure 4:
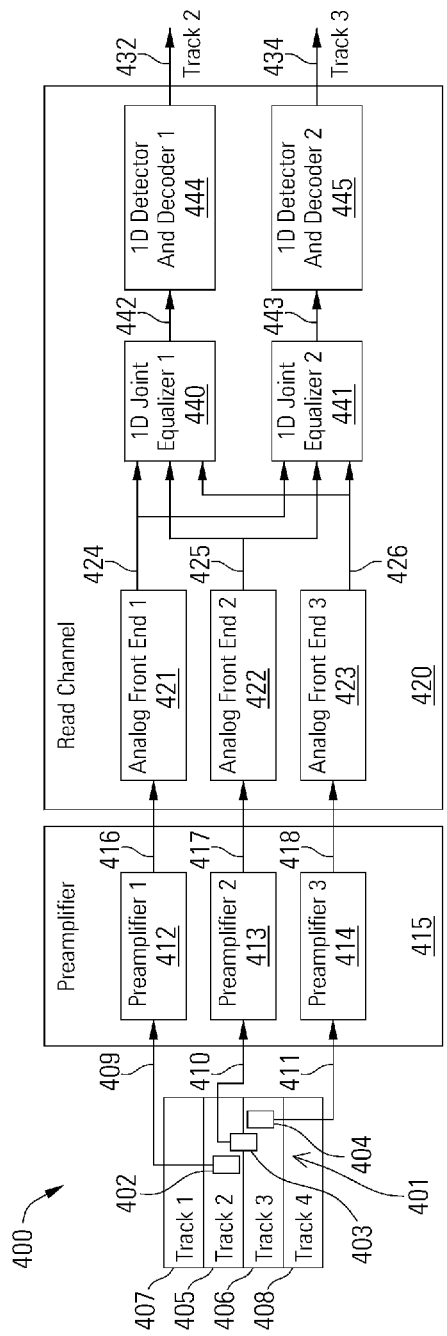
FIG. 4 depicts an array-reader magnetic recording system with multiple track detection including one-dimensional joint equalizers and one-dimensional detectors in accordance with some embodiments of the present invention.

Turning to FIG. 4, an array-reader magnetic recording system 400 with multiple track detection is depicted including one-dimensional joint equalizers 440, 441 and one-dimensional detectors and decoders 444, 445 in accordance with some embodiments of the present invention. The array-reader magnetic recording system 400 reads multiple data tracks 405, 406 simultaneously with a greater number of read heads 402, 403, 404 than the number of target data tracks 405, 406 being read. In the embodiment of FIG. 4, the array-reader 401 includes three read heads 402, 403, 404 with a width and spacing adapted to read two data tracks 405, 406 simultaneously. Although the array-reader 402 of FIG. 4 includes three read heads 402, 403, 404 with a width and spacing adapted to read two data tracks 405, 406 simultaneously, the array-reader magnetic recording system 400 can include an array-reader that reads any number of target data tracks greater than one, using any number of read heads that is greater than the number of target data tracks being read. Although some interference might be received from adjacent tracks 407, 408, the read heads 402, 403, 404 are arranged to generate output signals primarily from target data tracks 405, 406.

The analog signals 409, 410, 411 from the array-reader 401 are provided to preamplifiers 412, 413, 414 in an array-reader preamplifier 415, yielding amplified analog signals 416, 417, 418. The preamplifiers 412, 413, 414 can be any circuits known in the art that are capable of amplifying analog signals. Based upon the disclosure provided herein, one of ordinary skill in the art will recognize a variety of amplifier circuits that may be used in relation to different embodiments of the present invention.

The amplified analog signals 416, 417, 418 from the array-reader preamplifier 415 are provided to a read channel 420 which is operable to digitize, to perform data detection to detect correct values of digital data and in some embodiments to perform data decoding to detect and correct errors in a codeword, yielding data outputs 432, 434 representing the data originally stored on the storage medium. The amplified analog signals 416, 417, 418 from the array-reader preamplifier 415 are provided to the read channel 420 via flex-cable in some cases.

The read channel 420 includes analog front end circuits 421, 422, 423 to process the amplified analog signals 416, 417, 418 corresponding to each of the read heads 402, 403, 404. The analog front end circuits 421, 422, 423 perform functions such as, but not limited to, amplification, biasing, and filtering of the amplified analog signals 416, 417, 418, yielding processed analog signals 424, 425, 426. The analog front end circuits 421, 422, 423 can be any circuits known in the art for processing analog signals prior to sampling and further processing such as equalization and value detection. Based upon the disclosure provided herein, one of ordinary skill in the art will recognize a variety of analog front end circuits that can be used in relation to different embodiments of the present invention. The read channel 420 includes analog to digital converters (not shown) that sample the signals at any desired point in the data stream, such as after the analog front end circuits 421, 422, 423.

The processed analog signals 424, 425, 426 (or digitized versions thereof) are provided to one-dimensional joint equalizers 440, 441. In this embodiment, each of the one-dimensional joint equalizers 440, 441 receive input signals derived from all of the read heads 402, 403, 404 and equalizes its output to a one-dimensional partial response target adapted to the corresponding target data track. The one-dimensional joint equalizers 440, 441 each equalize or filter the data for their corresponding target data track 405, 406, yielding equalized outputs 442, 443 for each of the target data tracks 405, 406. In some embodiments, the one-dimensional joint equalizers 440, 441 are digital finite impulse response filters. Based upon the disclosure provided herein, one of ordinary skill in the art will recognize a variety of equalizer circuits that can be used in relation to different embodiments of the present invention.

The equalized outputs 442, 443 are provided to one-dimensional detectors and decoders 444, 445 which each apply a data detection algorithm to their corresponding equalized output 442, 443 to yield outputs 432, 434 each corresponding to one of the target data tracks 405, 406. The one-dimensional detectors and decoders 444, 445 apply a one-dimensional detection algorithm to their corresponding equalized outputs 442, 443 to detect the values of each data track 405, 406 using a decision trellis describing the properties of the signal and noise of just their corresponding data tracks 405, 406. In some embodiments of the present invention, the one-dimensional detectors and decoders 444, 445 apply a Viterbi detection algorithm as is known in the art. In other embodiments of the present invention, the one-dimensional detectors and decoders 444, 445 apply a maximum a posteriori detection algorithm as is known in the art. In other embodiments, yet other detection algorithms are applied by the one-dimensional detectors and decoders 444, 445. Based upon the disclosure provided herein, one of ordinary skill in the art will recognize a variety of data detector circuits that may be used in relation to different embodiments of the present invention.

The one-dimensional detectors and decoders 444, 445 also apply a data decoding algorithm in some embodiments, decoding a codeword from the detector for each of the data tracks 405, 406 to yield hard decisions at outputs 432, 434. In some embodiments, the detection and decoding process is performed in an iterative manner. In some embodiments, the one-dimensional detectors and decoders 444, 445 apply a low density parity check (LDPC) decoding algorithm as is known in the art. Based upon the disclosure provided herein, one of ordinary skill in the art will recognize other decoding algorithms that can be applied in one-dimensional detectors and decoders 444, 445 in relation to different embodiments of the present invention.

In some embodiments, when the read/write head is positioned over the storage medium or disk platter in zones where the head skew reduces the footprint of the array-reader to essentially one track (e.g., 405), the one-dimensional joint equalizer (e.g., 441) and one-dimensional detector and decoder (e.g., 445) for the other track (e.g., 406) is disabled or powered down.

Figure 5:
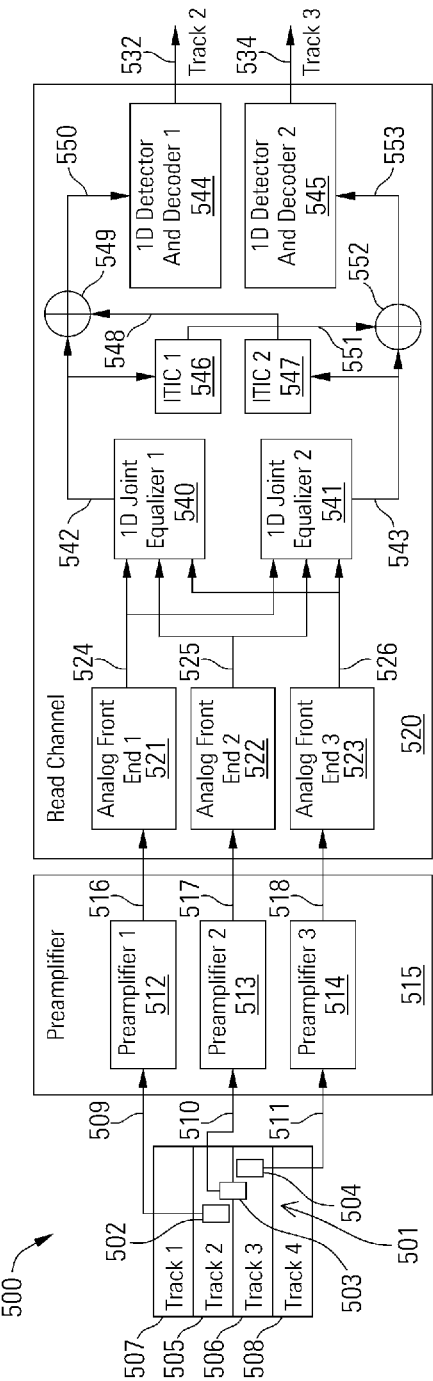
FIG. 5 depicts an array-reader magnetic recording system with multiple track detection including one-dimensional joint equalizers and one-dimensional detectors with inter-track interference cancellation in accordance with some embodiments of the present invention.

Turning to FIG. 5, an array-reader magnetic recording system 500 with multiple track detection is depicted including one-dimensional joint equalizers 540, 541 and one-dimensional detectors 544, 545 with inter-track interference cancellation in accordance with some embodiments of the present invention. The array-reader magnetic recording system 500 reads multiple data tracks 505, 506 simultaneously with a greater number of read heads 502, 503, 504 than the number of target data tracks 505, 506 being read. In the embodiment of FIG. 5, the array-reader 501 includes three read heads 502, 503, 504 with a width and spacing adapted to read two data tracks 505, 506 simultaneously. Although the array-reader 502 of FIG. 5 includes three read heads 502, 503, 504 with a width and spacing adapted to read two data tracks 505, 506 simultaneously, the array-reader magnetic recording system 500 can include an array-reader that reads any number of target data tracks greater than one, using any number of read heads that is greater than the number of target data tracks being read. Although some interference might be received from adjacent tracks 507, 508, the read heads 502, 503, 504 are arranged to generate output signals primarily from target data tracks 505, 506.

The analog signals 509, 510, 511 from the array-reader 501 are provided to preamplifiers 512, 513, 514 in an array-reader preamplifier 515, yielding amplified analog signals 516, 517, 518. The preamplifiers 512, 513, 514 can be any circuits known in the art that are capable of amplifying analog signals. Based upon the disclosure provided herein, one of ordinary skill in the art will recognize a variety of amplifier circuits that may be used in relation to different embodiments of the present invention.

The amplified analog signals 516, 517, 518 from the array-reader preamplifier 515 are provided to a read channel 520 which is operable to digitize, to perform data detection to detect correct values of digital data and in some embodiments to perform data decoding to detect and correct errors in a codeword, yielding data outputs 532, 534 representing the data originally stored on the storage medium. The amplified analog signals 516, 517, 518 from the array-reader preamplifier 515 are provided to the read channel 520 via flex-cable in some cases.

The read channel 520 includes analog front end circuits 521, 522, 523 to process the amplified analog signals 516, 517, 518 corresponding to each of the read heads 502, 503, 504. The analog front end circuits 521, 522, 523 perform functions such as, but not limited to, amplification, biasing, and filtering of the amplified analog signals 516, 517, 518, yielding processed analog signals 524, 525, 526. The analog front end circuits 521, 522, 523 can be any circuits known in the art for processing analog signals prior to sampling and further processing such as equalization and value detection. Based upon the disclosure provided herein, one of ordinary skill in the art will recognize a variety of analog front end circuits that can be used in relation to different embodiments of the present invention. The read channel 520 includes analog to digital converters (not shown) that sample the signals at any desired point in the data stream, such as after the analog front end circuits 521, 522, 523.

The processed analog signals 524, 525, 526 (or digitized versions thereof) are provided to one-dimensional joint equalizers 540, 541. In this embodiment, each of the one-dimensional joint equalizers 540, 541 receive input signals derived from all of the read heads 502, 503, 504 and equalizes its output to a one-dimensional partial response target adapted to the corresponding target data track. The one-dimensional joint equalizers 540, 541 each equalize or filter the data for their corresponding target data track 505, 506, yielding equalized outputs 542, 543 for each of the target data tracks 505, 506. In some embodiments, the one-dimensional joint equalizers 540, 541 are digital finite impulse response filters. Based upon the disclosure provided herein, one of ordinary skill in the art will recognize a variety of equalizer circuits that can be used in relation to different embodiments of the present invention.

An inter-track interference cancellation circuit 546, 547 is provided for each of the data channels corresponding to target data tracks 505, 506. The inter-track interference cancellation circuits 546, 547 generate inter-track interference cancellation signals 548, 551 which are subtracted from equalized outputs 542, 543 in adder circuits 549, 552, yielding detector inputs 550, 553. The inter-track interference cancellation circuits 546, 547 can be any known circuits for generating inter-track interference cancellation signals 548, 551 representing the inter-track interference between target data tracks 505, 506. Based upon the disclosure provided herein, one of ordinary skill in the art will recognize a variety of inter-track interference cancellation circuits that can be used in relation to different embodiments of the present invention.

The detector inputs 550, 553 are provided to one-dimensional detectors and decoders 544, 545 which each apply a data detection algorithm to their detector inputs 550, 553 to yield outputs 532, 534 each corresponding to one of the target data tracks 505, 506. The one-dimensional detectors and decoders 544, 545 apply a one-dimensional detection algorithm to their detector inputs 550, 553 to detect the values of each data track 505, 506. In some embodiments of the present invention, the one-dimensional detectors and decoders 544, 545 apply a Viterbi detection algorithm as is known in the art. In other embodiments of the present invention, the one-dimensional detectors and decoders 544, 545 apply a maximum a posteriori detection algorithm as is known in the art. In other embodiments, yet other detection algorithms are applied by the one-dimensional detectors and decoders 544, 545. Based upon the disclosure provided herein, one of ordinary skill in the art will recognize a variety of data detector circuits that may be used in relation to different embodiments of the present invention.

The one-dimensional detectors and decoders 544, 545 also apply a data decoding algorithm in some embodiments, decoding a codeword from the detector for each of the data tracks 505, 506 to yield hard decisions at outputs 532, 534. In some embodiments, the detection and decoding process is performed in an iterative manner. In some embodiments, the one-dimensional detectors and decoders 544, 545 apply a low density parity check (LDPC) decoding algorithm as is known in the art. Based upon the disclosure provided herein, one of ordinary skill in the art will recognize other decoding algorithms that can be applied in one-dimensional detectors and decoders 544, 545 in relation to different embodiments of the present invention.

In some embodiments, when the read/write head is positioned over the storage medium or disk platter in zones where the head skew reduces the footprint of the array-reader to essentially one track (e.g., 505), the unused inter-track interference cancellation circuit 546 and one-dimensional detector and decoder (e.g., 545) for the other track (e.g., 506) is disabled or powered down. In some embodiments, the one-dimensional joint equalizer (e.g., 541) and its inter-track interference cancellation circuit 547 are also disabled or powered down.

Figure 6:
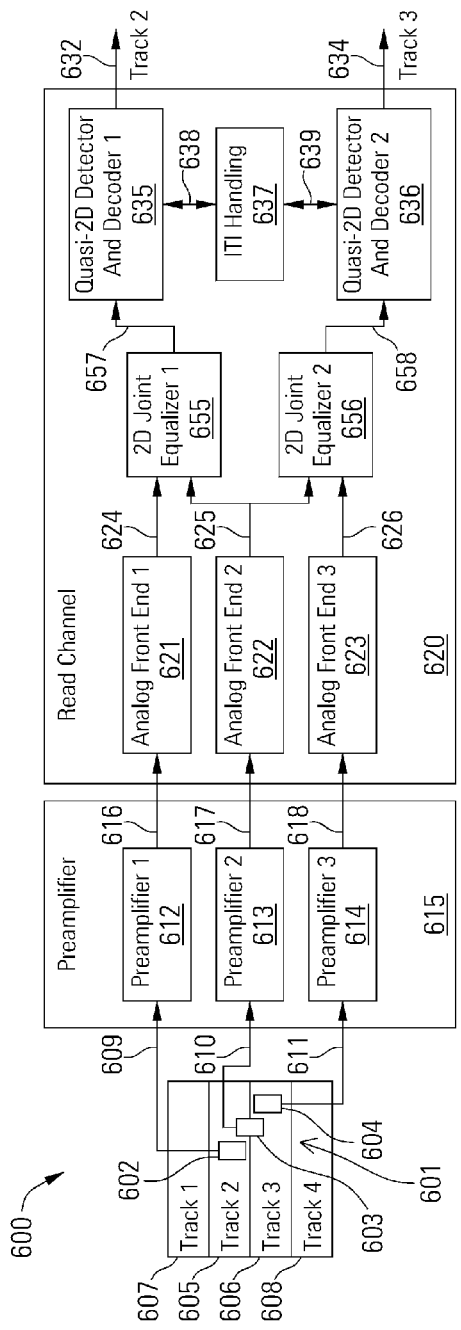
FIG. 6 depicts an array-reader magnetic recording system with multiple track detection including two-dimensional joint equalizers each processing signals from a subset of the array-reader outputs and including quasi-two-dimensional detectors with inter-track interference handling between detectors in accordance with some embodiments of the present invention.

Turning to FIG. 6, an array-reader magnetic recording system 600 with multiple track detection is depicted including two-dimensional joint equalizers 655, 656 each processing signals from a subset of the array-reader outputs and including quasi-two-dimensional detectors 6335, 636 with an inter-track interference handling circuit 637 in accordance with some embodiments of the present invention. In the array-reader magnetic recording system 600, only the subset of array-reader outputs most likely to assist in joint equalization are provided to each of the two-dimensional joint equalizers 655, 656. For example, the two-dimensional joint equalizer 655 for target data track 605 receives processed analog signals 624, 625 from read heads 602, 603 that are positioned over at least part of target data track 605. The two-dimensional joint equalizer 656 for target data track 606 receives processed analog signals 625, 626 from read heads 603, 604 that are positioned over at least part of target data track 606.

In this embodiment, the quasi-two-dimensional detectors 635, 636 are configured to pass information such as, but not limited to, hard decisions or likelihood information between each other through inter-track interference handler 637 so that inter-track interference can be cancelled by quasi-two-dimensional detectors 635, 636. In this embodiment, the quasi-two-dimensional detectors 635, 636 can operate with only slightly more complexity than a one-dimensional detector. The array-reader magnetic recording system 600 reads multiple data tracks 605, 606 simultaneously with a greater number of read heads 602, 603, 604 than the number of target data tracks 605, 606 being read. In the embodiment of FIG. 6, the array-reader 601 includes three read heads 602, 603, 604 with a width and spacing adapted to read two data tracks 605, 606 simultaneously. Although the array-reader 602 of FIG. 6 includes three read heads 602, 603, 604 with a width and spacing adapted to read two data tracks 605, 606 simultaneously, the array-reader magnetic recording system 600 can include an array-reader that reads any number of target data tracks greater than one, using any number of read heads that is greater than the number of target data tracks being read. Although some interference might be received from adjacent tracks 607, 608, the read heads 602, 603, 604 are arranged to generate output signals primarily from target data tracks 605, 606.

The analog signals 609, 610, 611 from the array-reader 601 are provided to preamplifiers 612, 613, 614 in an array-reader preamplifier 615, yielding amplified analog signals 616, 617, 618. The preamplifiers 612, 613, 614 can be any circuits known in the art that are capable of amplifying analog signals. Based upon the disclosure provided herein, one of ordinary skill in the art will recognize a variety of amplifier circuits that may be used in relation to different embodiments of the present invention.

The amplified analog signals 616, 617, 618 from the array-reader preamplifier 615 are provided to a read channel 620 which is operable to digitize, to perform data detection to detect correct values of digital data and in some embodiments to perform data decoding to detect and correct errors in a codeword, yielding data outputs 632, 634 representing the data originally stored on the storage medium. The amplified analog signals 616, 617, 618 from the array-reader preamplifier 615 are provided to the read channel 620 via flex-cable in some cases.

The read channel 620 includes analog front end circuits 621, 622, 623 to process the amplified analog signals 616, 617, 618 corresponding to each of the read heads 602, 603, 604. The analog front end circuits 621, 622, 623 perform functions such as, but not limited to, amplification, biasing, and filtering of the amplified analog signals 616, 617, 618, yielding processed analog signals 624, 625, 626. The analog front end circuits 621, 622, 623 can be any circuits known in the art for processing analog signals prior to sampling and further processing such as equalization and value detection. Based upon the disclosure provided herein, one of ordinary skill in the art will recognize a variety of analog front end circuits that can be used in relation to different embodiments of the present invention. The read channel 620 includes analog to digital converters (not shown) that sample the signals at any desired point in the data stream, such as after the analog front end circuits 621, 622, 623.

The processed analog signals 624, 625, 626 (or digitized versions thereof) are provided to two-dimensional joint equalizers 655, 656. In this embodiment, each of the two-dimensional joint equalizers 655, 656 receive input signals derived from a subset of the read heads 602, 603, 604 most likely to assist in joint equalization. Each of the two-dimensional joint equalizers 655, 656 includes two banks of three filters, each bank equalizing its output to a two dimensional partial response target. The two-dimensional joint equalizers 655, 656 each operate on an expanded trellis describing the joint properties of signal and noise on target data tracks 605, 606. In other words, the signal portion of the input to each two-dimensional joint equalizer 655, 656 is derived from multiple target data tracks 605, 606, and the decision trellis applied in each two-dimensional joint equalizer 655, 656 contains all possible options for the bits in the multiple target data tracks 605, 606. The two-dimensional joint equalizers 655, 656 equalize or filter the data for each of the target data tracks 605, 606, yielding equalized outputs 657, 658 for each of the target data tracks 605, 606. In some embodiments, the two-dimensional joint equalizers 655, 656 are digital finite impulse response filters. Based upon the disclosure provided herein, one of ordinary skill in the art will recognize a variety of equalizer circuits that can be used in relation to different embodiments of the present invention.

The equalized outputs 657, 658 are provided to quasi-two-dimensional detectors and decoders 635, 636 which each apply a data detection algorithm to their corresponding equalized output 657, 658 to yield outputs 632, 634 each corresponding to one of the target data tracks 605, 606. The quasi-two-dimensional detectors and decoders 635, 636 apply a quasi-two-dimensional detection algorithm to their corresponding equalized outputs 657, 658 to detect the values of each data track 605, 606 using a decision trellis describing the properties of the signal and noise of just their corresponding data tracks 605, 606. However, because the equalized outputs 657, 658 are equalized to a two-dimensional partial response target, the equalized outputs 657, 658 contain inter-track interference that is compensated for in quasi-two-dimensional detectors and decoders 635, 636 based on hard decisions or likelihood passed through inter-track interference handler 637. The inter-track interference handler 637 is operable to pass iterative messages 638, 639 between quasi-two-dimensional detectors and decoders 635, 636 that is used by each of the quasi-two-dimensional detectors and decoders 635, 636 to estimate the inter-track interference from the other target data track. In some embodiments, the inter-track interference handler 637 includes buffer or memory circuits that enable the iterative messages 638, 639 to be available to the quasi-two-dimensional detectors and decoders 635, 636 when needed, synchronizing the iterative messages 638, 639 to data in the quasi-two-dimensional detectors and decoders 635, 636 during the detection process.

In some embodiments of the present invention, the quasi-two-dimensional detectors and decoders 635, 636 apply a Viterbi detection algorithm as is known in the art. In other embodiments of the present invention, the quasi-two-dimensional detectors and decoders 635, 636 apply a maximum a posteriori detection algorithm as is known in the art. In other embodiments, yet other detection algorithms are applied by the quasi-two-dimensional detectors and decoders 635, 636. Based upon the disclosure provided herein, one of ordinary skill in the art will recognize a variety of data detector circuits that may be used in relation to different embodiments of the present invention.

The quasi-two-dimensional detectors and decoders 635, 636 also apply a data decoding algorithm in some embodiments, decoding a codeword from the detector for each of the data tracks 605, 606 to yield hard decisions at outputs 632, 634. In some embodiments, the detection and decoding process is performed in an iterative manner. In some embodiments, the quasi-two-dimensional detectors and decoders 635, 636 apply a low density parity check (LDPC) decoding algorithm as is known in the art. Based upon the disclosure provided herein, one of ordinary skill in the art will recognize other decoding algorithms that can be applied in quasi-two-dimensional detectors and decoders 635, 636 in relation to different embodiments of the present invention.

In some embodiments, when the read/write head is positioned over the storage medium or disk platter in zones where the head skew reduces the footprint of the array-reader to essentially one track (e.g., 605), the two-dimensional joint equalizer (e.g., 656) and quasi-two-dimensional detector and decoder (e.g., 636) and inter-track interference handler 637 for the other track (e.g., 606) is disabled or powered down and the remaining joint equalizer (e.g., 655) is configured with a one-dimensional partial response target for the available data track (e.g., 605).

Figure 7:
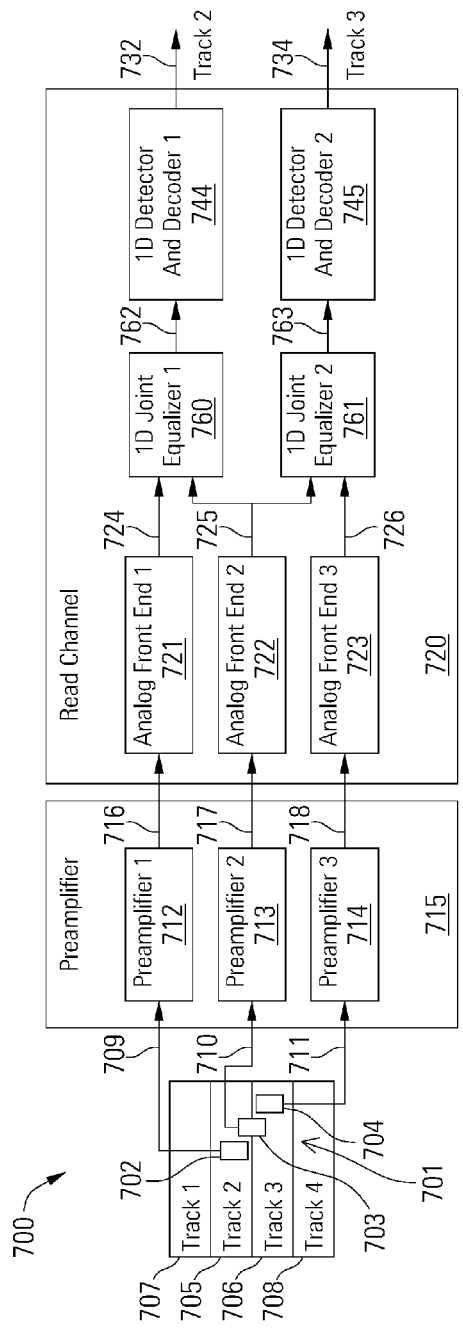
FIG. 7 depicts an array-reader magnetic recording system with multiple track detection including one-dimensional joint equalizers each processing signals from a subset of the array-reader outputs and including one-dimensional detectors in accordance with some embodiments of the present invention.

Turning to FIG. 7, an array-reader magnetic recording system 700 with multiple track detection is depicted including one-dimensional joint equalizers 760, 761 each processing signals from a subset of the array-reader outputs and including one-dimensional detectors 744, 745 in accordance with some embodiments of the present invention. In the array-reader magnetic recording system 700, only the subset of array-reader outputs most likely to assist in joint equalization are provided to each of the one-dimensional joint equalizers 760, 761. For example, the one-dimensional joint equalizer 760 for target data track 705 receives processed analog signals 724, 725 from read heads 702, 703 that are positioned over at least part of target data track 705. The one-dimensional joint equalizer 761 for target data track 706 receives processed analog signals 725, 726 from read heads 703, 704 that are positioned over at least part of target data track 706.

The array-reader magnetic recording system 700 reads multiple data tracks 705, 706 simultaneously with a greater number of read heads 702, 703, 704 than the number of target data tracks 705, 706 being read. In the embodiment of FIG. 7, the array-reader 701 includes three read heads 702, 703, 704 with a width and spacing adapted to read two data tracks 705, 706 simultaneously. Although the array-reader 702 of FIG. 7 includes three read heads 702, 703, 704 with a width and spacing adapted to read two data tracks 705, 706 simultaneously, the array-reader magnetic recording system 700 can include an array-reader that reads any number of target data tracks greater than one, using any number of read heads that is greater than the number of target data tracks being read. Although some interference might be received from adjacent tracks 707, 708, the read heads 702, 703, 704 are arranged to generate output signals primarily from target data tracks 705, 706.

The analog signals 709, 710, 711 from the array-reader 701 are provided to preamplifiers 712, 713, 714 in an array-reader preamplifier 715, yielding amplified analog signals 716, 717, 718. The preamplifiers 712, 713, 714 can be any circuits known in the art that are capable of amplifying analog signals. Based upon the disclosure provided herein, one of ordinary skill in the art will recognize a variety of amplifier circuits that may be used in relation to different embodiments of the present invention.

The amplified analog signals 716, 717, 718 from the array-reader preamplifier 715 are provided to a read channel 720 which is operable to digitize, to perform data detection to detect correct values of digital data and in some embodiments to perform data decoding to detect and correct errors in a codeword, yielding data outputs 732, 734 representing the data originally stored on the storage medium. The amplified analog signals 716, 717, 718 from the array-reader preamplifier 715 are provided to the read channel 720 via flex-cable in some cases.

The read channel 720 includes analog front end circuits 721, 722, 723 to process the amplified analog signals 716, 717, 718 corresponding to each of the read heads 702, 703, 704. The analog front end circuits 721, 722, 723 perform functions such as, but not limited to, amplification, biasing, and filtering of the amplified analog signals 716, 717, 718, yielding processed analog signals 724, 725, 726. The analog front end circuits 721, 722, 723 can be any circuits known in the art for processing analog signals prior to sampling and further processing such as equalization and value detection. Based upon the disclosure provided herein, one of ordinary skill in the art will recognize a variety of analog front end circuits that can be used in relation to different embodiments of the present invention. The read channel 720 includes analog to digital converters (not shown) that sample the signals at any desired point in the data stream, such as after the analog front end circuits 721, 722, 723.

The processed analog signals 724, 725, 726 (or digitized versions thereof) are provided to one-dimensional joint equalizers 760, 761. In this embodiment, each of the one-dimensional joint equalizers 760, 761 receive input signals derived from a subset of the read heads 702, 703, 704 that are likely to assist in joint equalization. The one-dimensional joint equalizers 760, 761 each equalize or filter the data for their corresponding target data track 705, 706, yielding equalized outputs 762, 763 for each of the target data tracks 705, 706. In some embodiments, the one-dimensional joint equalizers 760, 761 are digital finite impulse response filters. Based upon the disclosure provided herein, one of ordinary skill in the art will recognize a variety of equalizer circuits that can be used in relation to different embodiments of the present invention.

The equalized outputs 762, 763 are provided to one-dimensional detectors and decoders 744, 745 which each apply a data detection algorithm to their corresponding equalized output 762, 763 to yield outputs 732, 734 each corresponding to one of the target data tracks 705, 706. The one-dimensional detectors and decoders 744, 745 apply a one-dimensional detection algorithm to their corresponding equalized outputs 762, 763 to detect the values of each data track 705, 706 using a decision trellis describing the properties of the signal and noise of just their corresponding data tracks 705, 706. In some embodiments of the present invention, the one-dimensional detectors and decoders 744, 745 apply a Viterbi detection algorithm as is known in the art. In other embodiments of the present invention, the one-dimensional detectors and decoders 744, 745 apply a maximum a posteriori detection algorithm as is known in the art. In other embodiments, yet other detection algorithms are applied by the one-dimensional detectors and decoders 744, 745. Based upon the disclosure provided herein, one of ordinary skill in the art will recognize a variety of data detector circuits that may be used in relation to different embodiments of the present invention.

The one-dimensional detectors and decoders 744, 745 also apply a data decoding algorithm in some embodiments, decoding a codeword from the detector for each of the data tracks 705, 706 to yield hard decisions at outputs 732, 734. In some embodiments, the detection and decoding process is performed in an iterative manner. In some embodiments, the one-dimensional detectors and decoders 744, 745 apply a low density parity check (LDPC) decoding algorithm as is known in the art. Based upon the disclosure provided herein, one of ordinary skill in the art will recognize other decoding algorithms that can be applied in one-dimensional detectors and decoders 744, 745 in relation to different embodiments of the present invention.

In some embodiments, when the read/write head is positioned over the storage medium or disk platter in zones where the head skew reduces the footprint of the array-reader to essentially one track (e.g., 705), the one-dimensional joint equalizer (e.g., 761) and one-dimensional detector and decoder (e.g., 745) for the other track (e.g., 706) is disabled or powered down.

Figure 8:
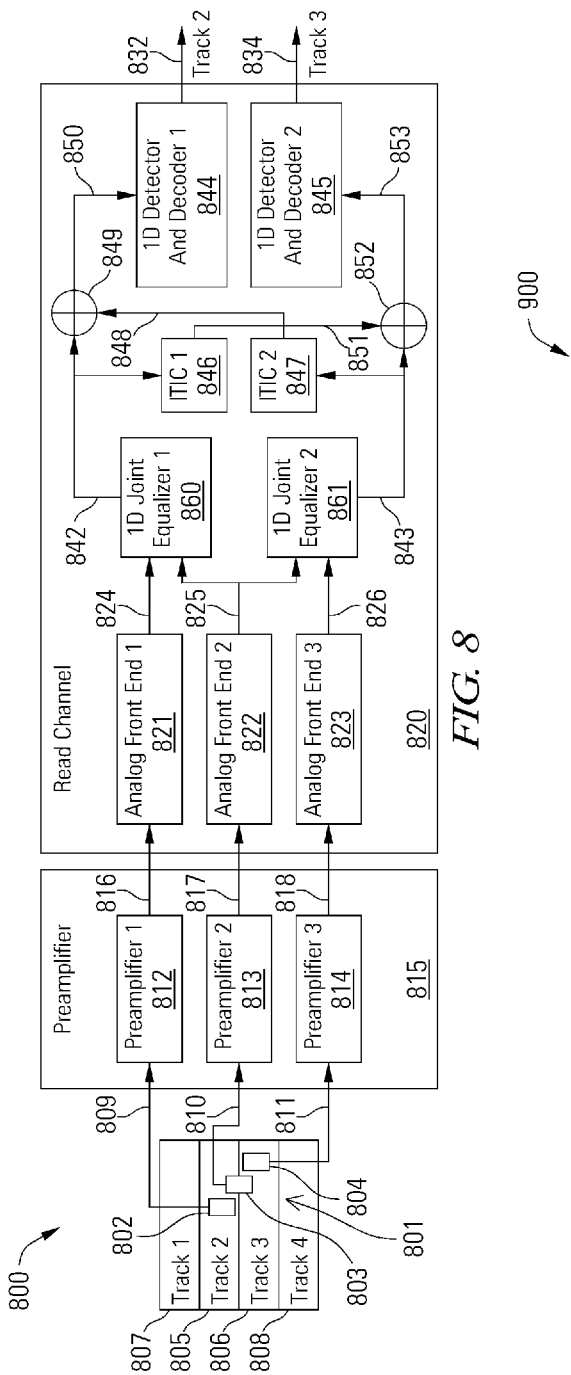
FIG. 8 depicts an array-reader magnetic recording system with multiple track detection including one-dimensional joint equalizers each processing signals from a subset of the array-reader outputs and including one-dimensional detectors with inter-track interference cancellation in accordance with some embodiments of the present invention.

Turning to FIG. 8, an array-reader magnetic recording system 800 with multiple track detection is depicted including one-dimensional joint equalizers 860, 861 each processing signals from a subset of the array-reader outputs and including one-dimensional detectors 844, 845 with inter-track interference cancellation circuits 846, 847 in accordance with some embodiments of the present invention. In the array-reader magnetic recording system 800, only the subset of array-reader outputs most likely to assist in joint equalization are provided to each of the one-dimensional joint equalizers 860, 861. For example, the one-dimensional joint equalizer 860 for target data track 805 receives processed analog signals 824, 825 from read heads 802, 803 that are positioned over at least part of target data track 805. The one-dimensional joint equalizer 861 for target data track 806 receives processed analog signals 825, 826 from read heads 803, 804 that are positioned over at least part of target data track 806.

The array-reader magnetic recording system 800 reads multiple data tracks 805, 806 simultaneously with a greater number of read heads 802, 803, 804 than the number of target data tracks 805, 806 being read. In the embodiment of FIG. 8, the array-reader 801 includes three read heads 802, 803, 804 with a width and spacing adapted to read two data tracks 805, 806 simultaneously. Although the array-reader 802 of FIG. 8 includes three read heads 802, 803, 804 with a width and spacing adapted to read two data tracks 805, 806 simultaneously, the array-reader magnetic recording system 800 can include an array-reader that reads any number of target data tracks greater than one, using any number of read heads that is greater than the number of target data tracks being read. Although some interference might be received from adjacent tracks 807, 808, the read heads 802, 803, 804 are arranged to generate output signals primarily from target data tracks 805, 806.

The analog signals 809, 810, 811 from the array-reader 801 are provided to preamplifiers 812, 813, 814 in an array-reader preamplifier 815, yielding amplified analog signals 816, 817, 818. The preamplifiers 812, 813, 814 can be any circuits known in the art that are capable of amplifying analog signals. Based upon the disclosure provided herein, one of ordinary skill in the art will recognize a variety of amplifier circuits that may be used in relation to different embodiments of the present invention.

The amplified analog signals 816, 817, 818 from the array-reader preamplifier 815 are provided to a read channel 820 which is operable to digitize, to perform data detection to detect correct values of digital data and in some embodiments to perform data decoding to detect and correct errors in a codeword, yielding data outputs 832, 834 representing the data originally stored on the storage medium. The amplified analog signals 816, 817, 818 from the array-reader preamplifier 815 are provided to the read channel 820 via flex-cable in some cases.

The read channel 820 includes analog front end circuits 821, 822, 823 to process the amplified analog signals 816, 817, 818 corresponding to each of the read heads 802, 803, 804. The analog front end circuits 821, 822, 823 perform functions such as, but not limited to, amplification, biasing, and filtering of the amplified analog signals 816, 817, 818, yielding processed analog signals 824, 825, 826. The analog front end circuits 821, 822, 823 can be any circuits known in the art for processing analog signals prior to sampling and further processing such as equalization and value detection. Based upon the disclosure provided herein, one of ordinary skill in the art will recognize a variety of analog front end circuits that can be used in relation to different embodiments of the present invention. The read channel 820 includes analog to digital converters (not shown) that sample the signals at any desired point in the data stream, such as after the analog front end circuits 821, 822, 823.

The processed analog signals 824, 825, 826 (or digitized versions thereof) are provided to one-dimensional joint equalizers 860, 861. In this embodiment, each of the one-dimensional joint equalizers 860, 861 receive input signals derived from a subset of the read heads 802, 803, 804 that are likely to assist in joint equalization. The one-dimensional joint equalizers 860, 861 each equalize or filter the data for their corresponding target data track 805, 806, yielding equalized outputs 842, 843 for each of the target data tracks 805, 806. In some embodiments, the one-dimensional joint equalizers 860, 861 are digital finite impulse response filters. Based upon the disclosure provided herein, one of ordinary skill in the art will recognize a variety of equalizer circuits that can be used in relation to different embodiments of the present invention.

An inter-track interference cancellation circuit 846, 847 is provided for each of the data channels corresponding to target data tracks 805, 806. The inter-track interference cancellation circuits 846, 847 generate inter-track interference cancellation signals 848, 851 which are subtracted from equalized outputs 842, 843 in adder circuits 849, 852, yielding detector inputs 850, 853. The inter-track interference cancellation circuits 846, 847 can be any known circuits for generating inter-track interference cancellation signals 848, 851 representing the inter-track interference between target data tracks 805, 806. Based upon the disclosure provided herein, one of ordinary skill in the art will recognize a variety of inter-track interference cancellation circuits that can be used in relation to different embodiments of the present invention.

The detector inputs 850, 853 are provided to one-dimensional detectors and decoders 844, 845 which each apply a data detection algorithm to their detector inputs 850, 853 to yield outputs 832, 834 each corresponding to one of the target data tracks 805, 806. The one-dimensional detectors and decoders 844, 845 apply a one-dimensional detection algorithm to their detector inputs 850, 853 to detect the values of each data track 805, 806. In some embodiments of the present invention, the one-dimensional detectors and decoders 844, 845 apply a Viterbi detection algorithm as is known in the art. In other embodiments of the present invention, the one-dimensional detectors and decoders 844, 845 apply a maximum a posteriori detection algorithm as is known in the art. In other embodiments, yet other detection algorithms are applied by the one-dimensional detectors and decoders 844, 845. Based upon the disclosure provided herein, one of ordinary skill in the art will recognize a variety of data detector circuits that may be used in relation to different embodiments of the present invention.

The one-dimensional detectors and decoders 844, 845 also apply a data decoding algorithm in some embodiments, decoding a codeword from the detector for each of the data tracks 805, 806 to yield hard decisions at outputs 832, 834. In some embodiments, the detection and decoding process is performed in an iterative manner. In some embodiments, the one-dimensional detectors and decoders 844, 845 apply a low density parity check (LDPC) decoding algorithm as is known in the art. Based upon the disclosure provided herein, one of ordinary skill in the art will recognize other decoding algorithms that can be applied in one-dimensional detectors and decoders 844, 845 in relation to different embodiments of the present invention.

In some embodiments, when the read/write head is positioned over the storage medium or disk platter in zones where the head skew reduces the footprint of the array-reader to essentially one track (e.g., 805), the unused inter-track interference cancellation circuit 846 and one-dimensional detector and decoder (e.g., 845) for the other track (e.g., 806) is disabled or powered down. In some embodiments, the one-dimensional joint equalizer (e.g., 861) and its inter-track interference cancellation circuit 847 are also disabled or powered down.

Figure 9:
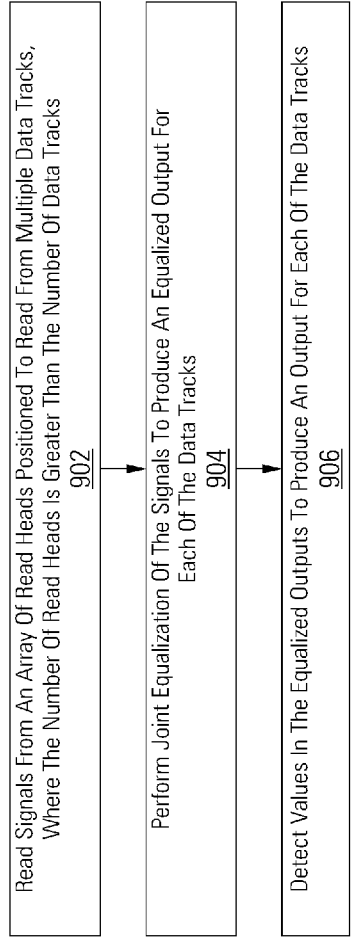
FIG. 9 depicts a flow diagram of an operation to perform multiple track detection of array-reader outputs in a magnetic recording system in accordance with some embodiments of the present invention.

Turning to FIG. 9, a flow diagram 900 depicts an operation to perform multiple track detection of array-reader outputs in a magnetic recording system in accordance with some embodiments of the present invention. Following flow diagram 900, signals are read from an array of read heads positioned to read from multiple data tracks, where the number of read heads is greater than the number of data tracks. (Block 900) Joint equalization of the signals is performed to produce an equalized output for each of the data tracks. (Block 902) The joint equalization is performed using information corresponding to multiple data tracks, and can be either one-dimensional or two-dimensional. One-dimensional equalization equalizes to a one-dimensional partial response target for a single data track, and two-dimensional equalization equalizes to a two-dimensional partial response target for two data tracks.

Values are detected to produce an output for each of the data tracks. (Block 904) The detection can be performed using a Viterbi detection algorithm, a maximum a posteriori data detection algorithm or any other suitable data detection algorithm. In some embodiments, the detection is one-dimensional using trellises describing the properties of signal and noise on each of the data tracks separately. In some embodiments, the detection is two-dimensional using a trellis describing the joint properties of signal and noise in both data tracks. In some embodiments, the detection is quasi-two dimensional in which the detector inputs are equalized to two-dimensional partial response targets and decisions or detected values are passed between quasi-two-dimensional detectors to allow cancellation of inter-track interference in the detectors.

Additional processing, such as data decoding using a low density parity check decoder or other type of decoder, can be performed to yield user data based on a codeword from the detector.

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, embodiments of the present invention provide novel systems, devices, methods and arrangements for an array-reader based magnetic recording system with multiple track detection. While detailed descriptions of one or more embodiments of the invention have been given above, various alternatives, modifications, and equivalents will be apparent to those skilled in the art without varying from the spirit of the invention. Therefore, the above description should not be taken as limiting the scope of embodiments of the invention which are encompassed by the appended claims.

What is claimed is:

1. An apparatus for reading data comprising:
an array of analog inputs operable to receive analog signals retrieved from a magnetic storage medium, wherein the analog inputs correspond to a plurality of data tracks on the magnetic storage medium, and wherein a number of analog inputs in the array of analog inputs is greater than a number of data tracks in the plurality of data tracks;
at least one joint equalizer operable to filter the analog inputs to yield an equalized output for each of the plurality of data tracks; and
at least one data detector operable to apply a detection algorithm to the equalized output from the at least one joint equalizer to yield detected values for each of the plurality of data tracks.

2. The apparatus of claim 1, wherein the at least one joint equalizer comprises a joint equalizer for each of the data tracks in the plurality of data tracks.

3. The apparatus of claim 1, wherein the at least one joint equalizer comprises a two-dimensional joint equalizer operable to apply a partial response target for two of the plurality of data tracks.

4. The apparatus of claim 1, wherein the at least one joint equalizer comprises a plurality of one-dimensional joint equalizers, each operable to apply a partial response target for a different one of the plurality of data tracks.

5. The apparatus of claim 1, wherein the at least one joint equalizer filters all of the array of analog inputs to yield the equalized output for each of the plurality of data tracks.

6. The apparatus of claim 1, wherein the at least one joint equalizer filters a subset of the array of analog inputs to yield the equalized output for each of the plurality of data tracks.

7. The apparatus of claim 6, wherein the at least one joint equalizer comprises a plurality of joint equalizers, each operable to yield the equalized output for a different one of the plurality of data tracks, and wherein each of the plurality of joint equalizers filters all of the array of analog inputs read from said different one of the plurality of data tracks and omits a remainder of the array of analog inputs that are not read from said different one of the plurality of data tracks to yield the equalized output.

8. The apparatus of claim 1, wherein the at least one data detector comprises a two-dimensional data detector.

9. The apparatus of claim 1, wherein the at least one data detector comprises a plurality of one-dimensional data detectors, each detecting values of one of the plurality of data tracks.

10. The apparatus of claim 9, wherein the equalized outputs processed by each of the plurality of one-dimensional data detectors are equalized using a one-dimensional partial response target.

11. The apparatus of claim 9, further comprising a plurality of inter-track interference cancellation circuits operable to calculate inter-track interference of the equalized outputs and to subtract the inter-track interference from the equalized outputs.

12. The apparatus of claim 1, wherein the at least one data detector comprises a plurality of quasi-two-dimensional data detectors, each detecting values of one of the plurality of data tracks, wherein the equalized outputs processed by each of the plurality of quasi-two-dimensional data detectors are equalized using a two-dimensional partial response target, the apparatus further comprising an inter-track interference handling circuit operable to pass decision information between the plurality of quasi-two-dimensional data detectors.

13. The apparatus of claim 1, further comprising at least one data decoder operable to decode the detected values to yield hard decisions for each of the plurality of data tracks.

14. A method of performing multiple track detection of array-reader outputs in a magnetic storage system, comprising:
receiving an array of analog inputs corresponding to a plurality of data tracks on the magnetic storage medium, wherein a number of analog inputs in the array of analog inputs is greater than a number of data tracks in the plurality of data tracks;
applying joint equalization to the analog inputs to yield an equalized output for each of the plurality of data tracks; and
applying a data detection algorithm to the equalized output to yield detected values for each of the plurality of data tracks.

15. The method of claim 14, wherein applying the joint equalization comprises applying a two-dimensional joint equalization based on a two-dimensional partial response target for two of the plurality of data tracks.

16. The method of claim 14, wherein applying the joint equalization comprises applying a one-dimensional joint equalization for each of the plurality of data tracks to analog inputs read from more than one of the plurality of data tracks to yield the equalized output for a single one of the plurality of data tracks, based on a one-dimensional partial response target for said single one of the plurality of data tracks.

17. The method of claim 14, further comprising discontinuing a portion of the joint equalization based on a head skew of an array-reader from which the array of analog inputs are received.

18. The method of claim 14, further comprising discontinuing a portion of the application of the data detection algorithm based on a head skew of an array-reader from which the array of analog inputs are received.

19. The method of claim 14, further comprising applying a data decoding algorithm to the detected outputs to yield hard decisions for each of the plurality of data tracks.

* * * * *